United States Patent
Guo et al.

(10) Patent No.: US 11,568,062 B2
(45) Date of Patent: Jan. 31, 2023

(54) METHODS TO PROTECT NEURAL NETWORK MODELS

(71) Applicant: Baidu USA LLC, Sunnyvale, CA (US)

(72) Inventors: Min Guo, Sunnyvale, CA (US); Manjiang Zhang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 630 days.

(21) Appl. No.: 16/598,909

(22) Filed: Oct. 10, 2019

(65) Prior Publication Data

US 2021/0110048 A1    Apr. 15, 2021

(51) Int. Cl.
    *G06F 21/60*    (2013.01)
    *H04L 9/00*     (2022.01)
    *H04L 9/06*     (2006.01)
    *G06N 3/02*     (2006.01)

(52) U.S. Cl.
    CPC ............. *G06F 21/602* (2013.01); *G06N 3/02* (2013.01); *H04L 9/006* (2013.01); *H04L 9/0643* (2013.01)

(58) Field of Classification Search
    CPC ......... G06F 21/602; G06N 3/02; H04L 9/006; H04L 9/0643
    See application file for complete search history.

(56) References Cited

U.S. PATENT DOCUMENTS

| | | | |
|---|---|---|---|
| 10,909,033 B1* | 2/2021 | Fang | G06F 3/0673 |
| 11,119,798 B2* | 9/2021 | Tshouva | G06F 9/3897 |
| 2012/0124381 A1* | 5/2012 | Kim | H04L 9/0643 713/176 |
| 2018/0150684 A1* | 5/2018 | Wang | G06V 40/169 |
| 2018/0173571 A1* | 6/2018 | Huang | G06N 3/0454 |
| 2019/0129888 A1* | 5/2019 | Bowman | G06F 12/0292 |
| 2020/0304573 A1* | 9/2020 | Resch | G06F 3/0604 |

\* cited by examiner

*Primary Examiner* — Kambiz Zand
*Assistant Examiner* — Phuc Pham
(74) *Attorney, Agent, or Firm* — Womble Bond Dickinson (US) LLP

(57) ABSTRACT

A method and system is disclosed for protecting neural network models by segmenting partitions of the models into segments of pre-configured memory size, hashing the segmented models, and concatenating the hash segments. The concatenated hash segment may be further hashed, encrypted, and stored with the neural network models as an executable loadable file (ELF) in memories external to the neural network prior to the use of the models by the neural network. The models may include model weights of the inference layers and metadata. The model weights and the metadata may be hashed as separate hash segments and concatenated. Segmenting the models into segments of pre-configured memory size and hashing the segmented models offline prior to the operation of the neural network enables rapid validation of the models when the models are used in the inference layers during online operation of the neural network.

18 Claims, 10 Drawing Sheets

200

| Application 201 | Planning and Control 202 | Perception 203 | Device Driver(s) 204 | Firmware 205 | Hardware 206 |

FIG. 2

METHODS TO PROTECT NEURAL NETWORK MODELS

TECHNICAL FIELD

Embodiments of the present disclosure relate generally to machine learning. More particularly, embodiments of the disclosure relate to protecting software models used by machine learning engines or neural networks in artificial intelligence applications.

BACKGROUND

Neural networks are used in applications such as computer vision, natural language processing, robotics, and autonomous driving vehicles (ADVs). For example, neural networks may operate vehicles in an autonomous mode (e.g., driverless) to relieve occupants, especially the driver, from some driving-related responsibilities. When operating in an autonomous mode, a vehicle can navigate to various locations using onboard sensors, allowing the vehicle to travel with minimal human interaction or in some cases without any passengers. Neural networks may generate commands to plan and control the motion of the vehicles by processing video and electromagnetic images of environments around the vehicles captured by the onboard sensors. For example, neural networks may generate or train a set of rules, algorithms, and/or predictive models for perception, prediction, decision, planning, and/or control processes in the autonomous mode.

The accuracy and efficiency of the motion planning and control operations depends heavily on the models used by the neural networks. Integrity of the models is important for the proper operation of the neural networks and also for the safety of those inside and outside the vehicles. Neural network may perform verification and integrity check of the models to protect against hacking, tampering, or attacks prior to using the models through cryptography such as public key infrastructure (PKI). Due to their large size, neural network models are generally stored in memories outside a neural network and copied into smaller memories inside the neural network during operation.

However, the large size of the models makes it difficult to perform full image verification when the neural network is operating. It also may not be feasible to perform pre-load verification prior to the start of operation. Even though memories in the neural network may be hardware protected from unauthorized access by limiting access only from a cryptographic module, the external memories do not have the same hardware protection and may not be secure.

BRIEF DESCRIPTION OF THE DRAWINGS

Embodiments of the disclosure are illustrated by way of example and not limitation in the figures of the accompanying drawings in which like references indicate similar elements.

FIG. 2 is a block diagram illustrating an architecture of an autonomous driving system operating according to one embodiment.

DETAILED DESCRIPTION

Figure 1:
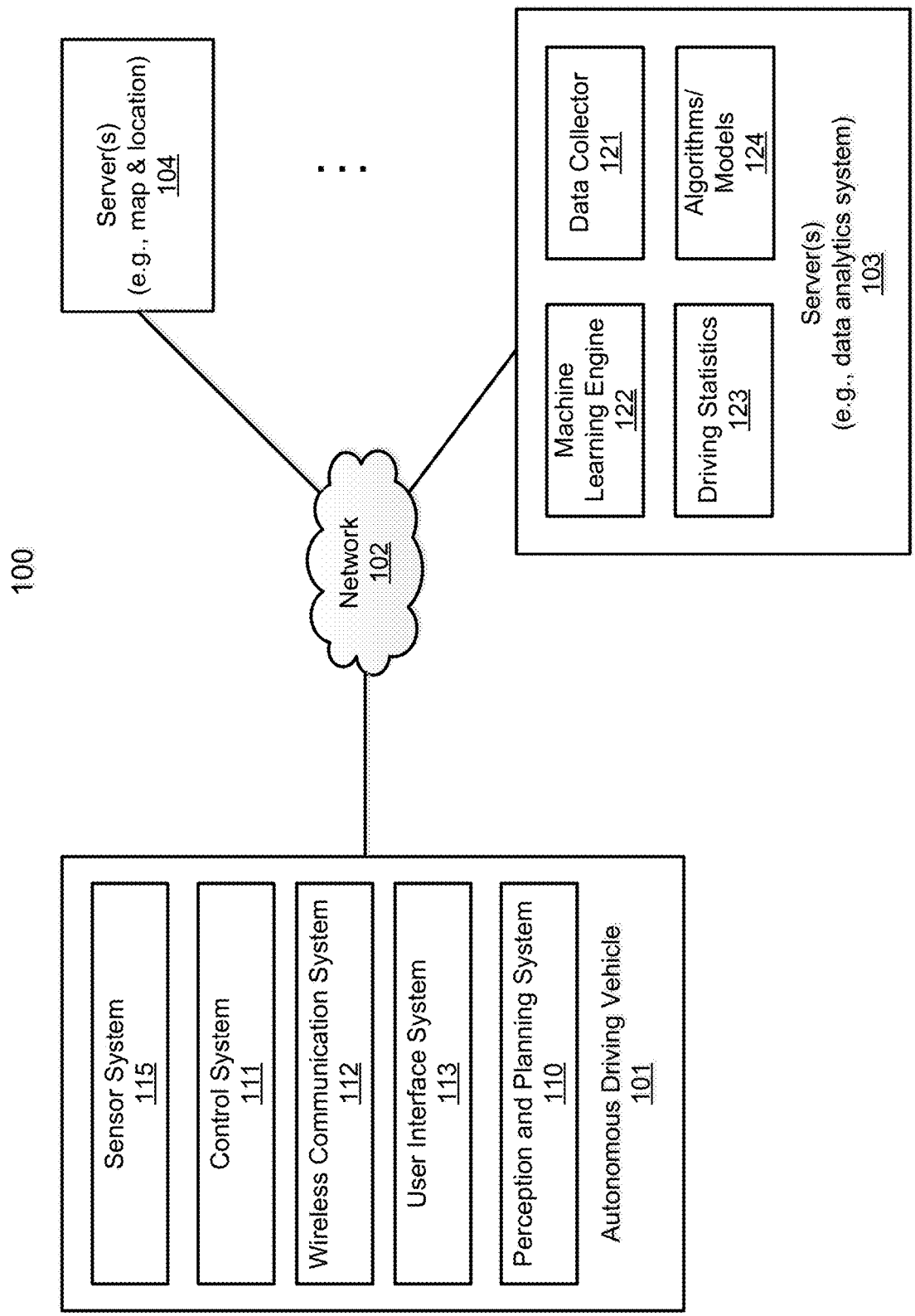
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, a method is disclosed for protecting neural network models by segmenting partitions of the models into segments of pre-configured memory size, hashing the segmented models, and concatenating the hash segments. The concatenated hash segment may be further hashed, encrypted, and stored with the neural network models as an executable loadable file (ELF) in memories external to the neural network prior to the use of the models by the neural network. The pre-configured memory size may be selected to strike a balance between the processing requirement of the hashing operation and the number of hash segments of the models.

In one embodiment, when a partition of the models is less than the pre-configured memory size, the method may group as many of the partitions as can be combined to fit into the pre-configured memory size without exceeding it. The models may include model weights of the inference layers and metadata that contains model description and quantization configuration data. The model weights and the metadata may be hashed as separate hash segments and concatenated. Segmenting the models into segments of pre-configured memory size and hashing the segmented models offline prior to the operation of the neural network enables rapid validation of the models when the models are used in the inference layers during operation of the neural network.

In one embodiment, the neural network may read the ELF containing the model weights, the metadata, and the concatenated hash segment from the external memory into an internal memory of the neural network when the models are ready for use by the neural network. If the concatenated hash segment is encrypted, it may be decrypted by a cryptographic module to verify the concatenated hash segment. The neural network may read the metadata into a partition of the internal memory having an allocated memory size equivalent to the pre-configured memory size of the segmented models. The size of the metadata is assumed to be less than the pre-configured memory size. The cryptographic module may hash the metadata in the internal memory partition and may compare the online-generated hash metadata with the offline-generated hash metadata from the concatenated hash segment to verify the metadata.

The neural network may also read successive partitions of the model weights into the internal memory partition having the pre-configured memory size. The cryptographic module may hash the model weights in the memory partition and may compare the online-generated hash of the model weights with the offline-generated hash of the model weights from the concatenated hash segment to verify the model weights. When all the model weights for an inference layer has been verified, the neural network may use the model weights to run the inference for the layer. Model weights for successive layers may be verified until the neural network completes all the inference layers. While the description that follows illustrates the method for validating neural network models for use in ADVs, it is understood that the method may also be applied to neural network models used in other applications.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for autonomous vehicle 101 or a variety of clients. In one embodiment, data analytics system 103 includes data collector 121 and machine learning engine 122. Data collector 121 collects driving statistics 123 from autonomous vehicle 101, or from a variety of vehicles driven autonomously or by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include models, rules or algorithms for perception, prediction, decision, planning, and/or control processes. Algorithms and models 124 can then be uploaded on ADVs to be utilized during autonomous driving in real-time. For example, control system 111 or perception and planning system 110 may be neural networks that use the algorithms and models 124 and real-time local environment data sensed by sensor system 115 to perceive obstacles, predict motions of other vehicles, and plan and control the motion of autonomous vehicle 101.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

FIG. 2 is a block diagram illustrating system architecture for autonomous driving according to one embodiment. System architecture 200 may represent system architecture of an autonomous driving system as shown in FIG. 1. Referring to FIG. 2, system architecture 200 includes, but it is not limited to, application layer 201, planning and control (PNC) layer 202, perception layer 203, driver layer 204, firmware layer 205, and hardware layer 206. Application layer 401 may include user interface or configuration application that interacts with users or passengers of an autonomous driving vehicle, such as, for example, functionalities associated with user interface system 113. PNC layer 202 may include functionalities of perception and planning system 110 and control system 111. Perception layer 203 may include functionalities of at least perception and planning system 110. Firmware layer 205 may represent at least the functionality of sensor system 115, which may be implemented in a form of a field programmable gate array (FPGA). Hardware layer 206 may represent the hardware of the autonomous driving vehicle such as control system 111. Layers 201-203 can communicate with firmware layer 205 and hardware layer 206 via device driver layer 204. PNC layer 202 and perception 203 layer may run on neural networks whose models, such as algorithms and models 124, are protected by embodiments of the disclosure. The models may be protected by segmenting the models into segments of pre-configured memory size and hashing the segmented models offline prior to the operation of the neural networks. The hash segments of the models may be verified to enable rapid validation of the models when the models are used in the inference layers during operation of the neural networks.

Figure 3:
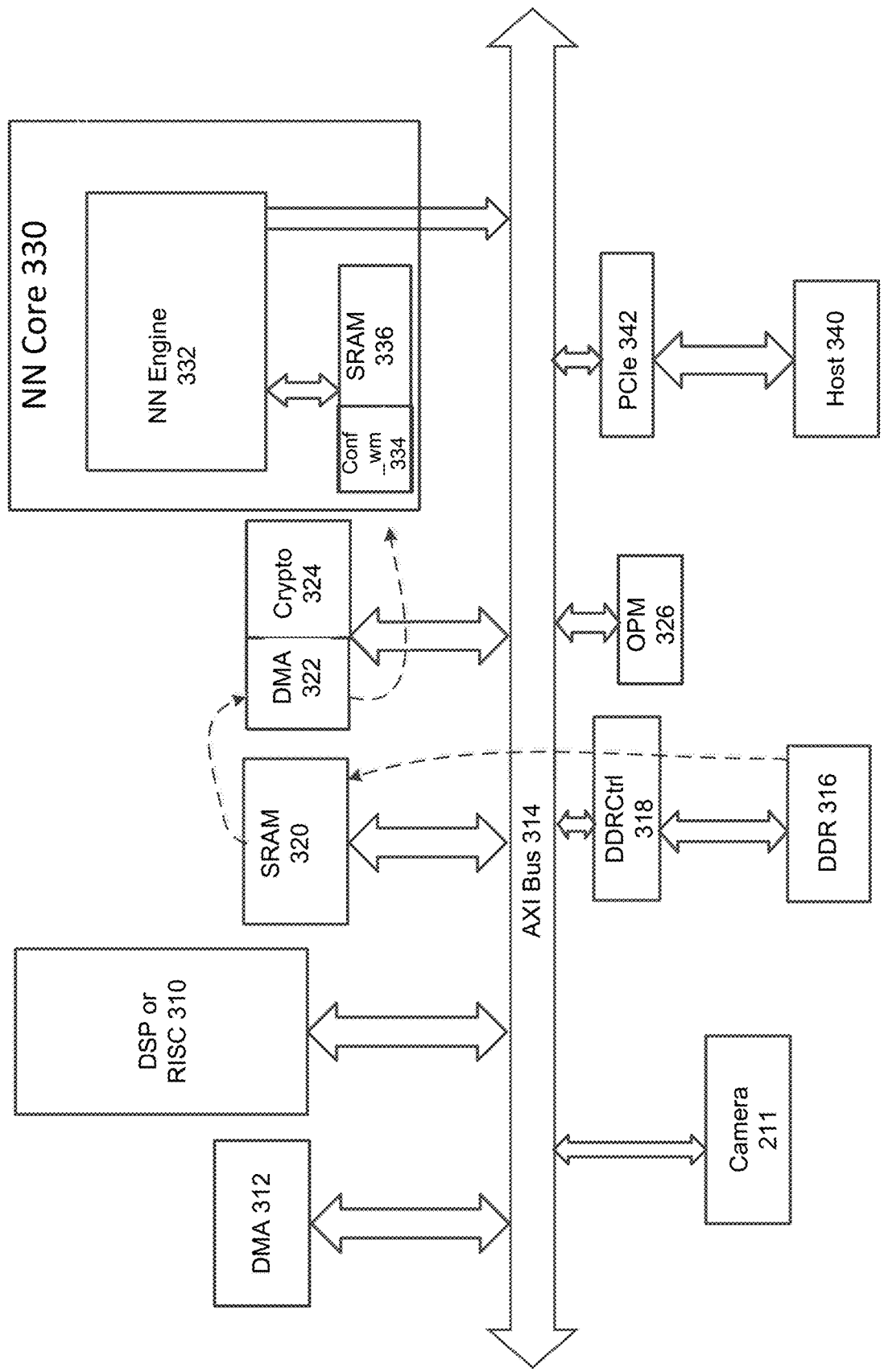
FIG. 3 is an architecture of a neural network core in a host computing system in which neural network models are downloaded into a SRAM of the neural network core from external memories according to one embodiment.

FIG. 3 is an architecture of a neural network (NN) core 330 in a host computing system in which NN models are downloaded into a SRAM of the NN core 330 from external memories according to one embodiment. The NN core 330 may be part of control system 111 or perception and planning system 110 of autonomous vehicle 101, and the host computing system may be a processor of autonomous vehicle 101 or servers 103-104.

NN core 330 includes NN engine 332 and NN SRAM 336. NN engine 332 runs the NN algorithms and models of the inference layers for one or more processes such as perception, prediction, decision, planning, or control of autonomous vehicle 101. NN engine 332 may access NN models stored in NN SRAM 336. NN SRAM 336 may have a portion of its memory partitioned to store a segment of model weights of the NN models or to store metadata of the NN models for online verification of the NN models as will be explained. The partitioned memory of SRAM 336 is designated conf_wm (configured weight memory) 334 and may have the same memory size as the pre-configured memory size of the segment of the model weights or the metadata of the NN model used to generate offline the hash segments.

The host computing system includes DSP or RISC 310, and memories including DDR (double-data rate) memories 316 such as DDR DRAM, SRAM 320, and OPM (one-time programmable memory) 326. Due to the large size of the NN models, the NN models may be stored in DDR memories 316 externally to NN core 330 when NN core is offline. The NN models may be stored as executable loadable files (ELFs). DDR Control 318 module generates the control signals to access and refresh DDR memories 316. In one embodiment, DSP or RISC 310 may be configured to segment or group the model weights offline into segments of the pre-configured memory size, hash the segmented model weights or the metadata, and to concatenate the hash segments.

The host computing system includes sensors from sensor system 115 such as camera 211. DMA module 312 allow camera 211 and other peripherals to have direct memory access (DMA) capability to DDR memories 316. A separate DMA module 322 provides DMA capability for NN core 330 to download NN models from DDR memories 316. A bus such as AXI (Advanced eXtensible Interface) bus 314 communicatively couples NN core 330, DSP or RISC 310, the memory subcomponents, and camera 211. An external host 340 may also communicate with the host computing system through an interface such as PCIe (peripheral component interconnect express) 342.

When NN core 330 is activated to run NN algorithms, DMA module 322 may download NN models from DDR memories 316 into NN SRAM 336. The NN models may be download as ELFs. Each ELF may contain the model weights, the metadata, and the concatenated hash segment containing offline-generated hash of segmented model weights and hash of the metadata. In one embodiment, the NN models may be copied first from DDR memories 316 into SRAM 320 external to NN core 330, and then from SRAM 320 to NN SRAM 336. To protect NN SRAM 336 against unauthorized access by the host computing system, external access to NN SRAM 336 is made only through cryptographic module 324. Cryptographic module 324 may download the metadata or successive segments of the model weights of the NN models having the pre-configured memory size into conf_wm 334 partition of NN SRAM 336. Cryptographic module 324 may hash the metadata or each segment of the model weights stored in conf_wm 334 and may compare the online-generated hash of the metadata or the segments of the model weights with their corresponding offline-generated hash to verify the NN models. When the NN models for an inference layer is verified, NN core 330 may use the NN models to run NN algorithms for the inference layer. Cryptographic module 324 may verify NN models for successive inference layers until NN core 330 completes all the inference layers.

Figure 4:
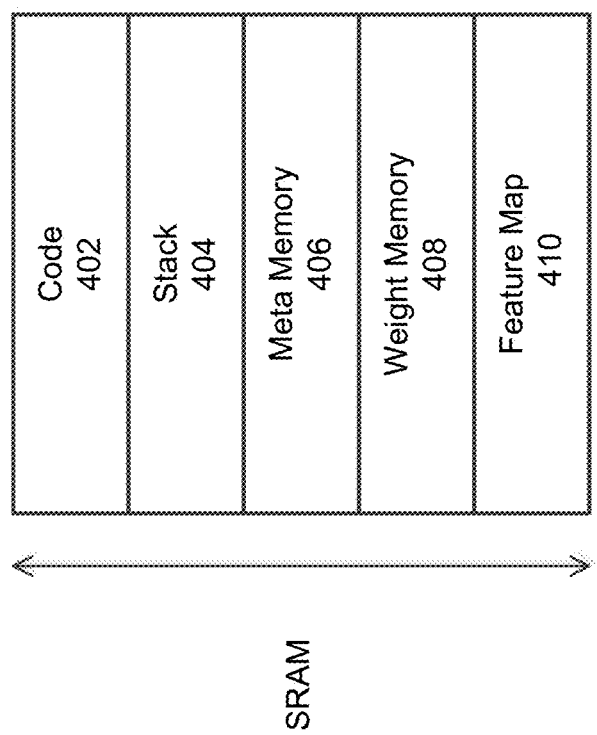
FIG. 4 shows memory partitions of a SRAM of the neural network core according to one embodiment.

FIG. 4 shows memory partitions of NN SRAM 336 of NN core 330 according to one embodiment. NN SRAM 336 may store algorithms and models 124 used by NN engine 332. NN SRAM 336 and NN engine 332 of NN core 330 may be configured as a secure island or virtual machine sandbox protected by cryptographic module 324 against unauthorized or accidental access by sources external to NN core 330.

Partitions of NN SRAM 336 include code 402, stack 404, meta memory 406, weight memory 408, and feature map 410. Code 402 contains the software code executed by NN engine 332 to run the NN algorithms. Stack 404 contains the memory stack used by NN engine 332 during execution. Feature map 410 is runtime-generated output from the NN algorithms such as the output from the inference layers. Code 402, stack 404, and feature map 410 are not protected against tampering.

Meta memory 406 contains the metadata of the NN models and may include model description data such as model activation range, quantization scale and shift, and other configuration data. Weight memory 408 contains the model weights of the inference layers. The model weights and the metadata are protected and verified using hash segments as disclosed by one or more embodiments. To speed up the inference, cryptographic module 324 may verify the model weights and the metadata online during runtime using the hash segments before the model weights and the metadata are used by the inference layers. In one embodiment, the hash segment may be encrypted using the private key of an offline-generated public, private key pair. The encrypted hash segment may be decrypted using the public key during runtime. As mentioned, the NN models and the hash segment of the NN models may be stored as ELFs in memories external to NN core 330 and downloaded into NN SRAM 336 prior to runtime.

Figure 5:
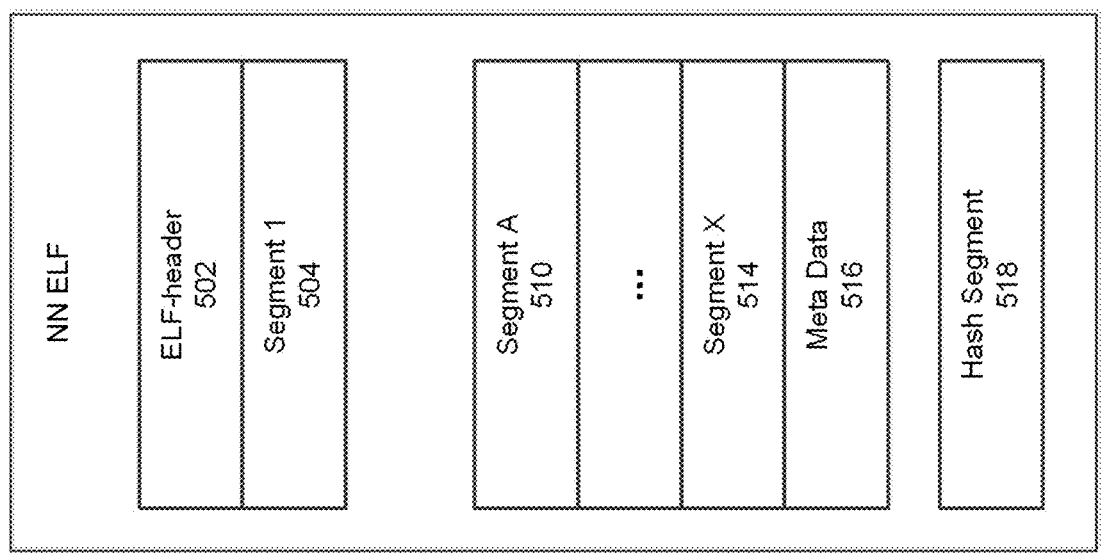
FIG. 5 shows a neural network executable loadable file containing models that are downloaded into the SRAM of the neural network according to one embodiment.

FIG. 5 shows a NN ELF containing NN models that are downloaded into NN SRAM 336 of the NN core 330 according to one embodiment. The NN ELF may contain the NN models for one or more inference layers. The NN ELF includes ELF-header 502 that contains information about the size and partitions of the NN ELF and the size of the NN models. Multiple memory partitions follow ELF-header 502. For example, the first memory partition, segment 1 (504), may contain information other than model weights and metadata. Subsequent memory partitions, segment A (510) through segment X (514) may contain the model weights followed by the partition 516 for the metadata. The memory partitions may be different sizes.

To protect the model weights and the metadata, and to facilitate online verification, the memory partitions of model weights and metadata may be segmented into a fixed pre-configured memory size and the segmented models may be hashed in an offline operation before the NN models are downloaded into NN core 330. The pre-configured memory size may be selected to strike a balance between the processing time for hashing the segmented models and the number of hash segments of the NN models. For example, if the pre-configured memory size is small, the time to hash each segment may be short but there would be more segments of the NN models to hash. On the other hand, if the pre-configured memory size is large, the time to hash each segment may be long but there would be fewer segments of the NN model to hash. The pre-configured memory size may further depend on the size of NN SRAM 336. In one embodiment, the pre-configured memory size is 2 MB. After the pre-configured memory size is determined, the conf_wm 334 partition of NN SRAM 336 may be set to the same size to facilitate online verification of the NN models using the hash segments.

Figure 6:
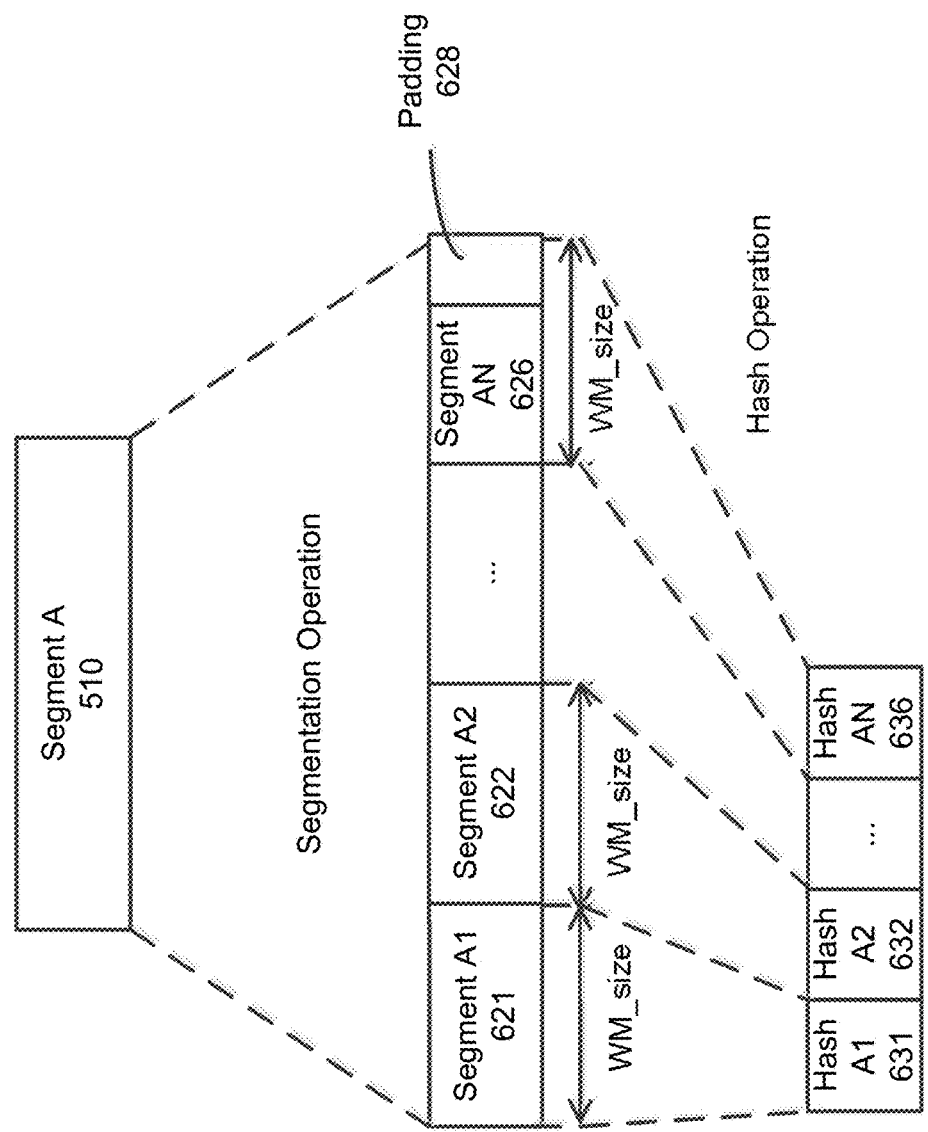
FIG. 6 illustrates segmentation and hashing of a memory partition of model weights of the neural network executable loadable file when the size of the memory partition of the model weights is greater than a pre-configured weight-memory size according to one embodiment.

FIG. 6 illustrates segmentation and hashing of a memory partition of model weights of the NN ELF when the size of the memory partition of the model weights is greater than a pre-configured memory size according to one embodiment. The memory partition of the model weights may be segment A (510) of FIG. 5. The pre-configured memory size is referred to as wm_size, or weight memory size.

When segment A (510) is larger than the wm_size, a segmentation operation may divide segment A (510) into one or more segments, each segments having the wm_size. The segments are designated as segment A1 (621), segment A2 (622), etc. The last segment AN (626) may be less than the wm_size. In one embodiment, padding 628 may be added to bring the size of the last segment AN (626) to wm_size. A hashing operation may hash each of the segments to generate hash A1 (631), hash A2 (632), . . . hash AN (636). The hash segments of segment A (510) may be concatenated together.

Figure 7:
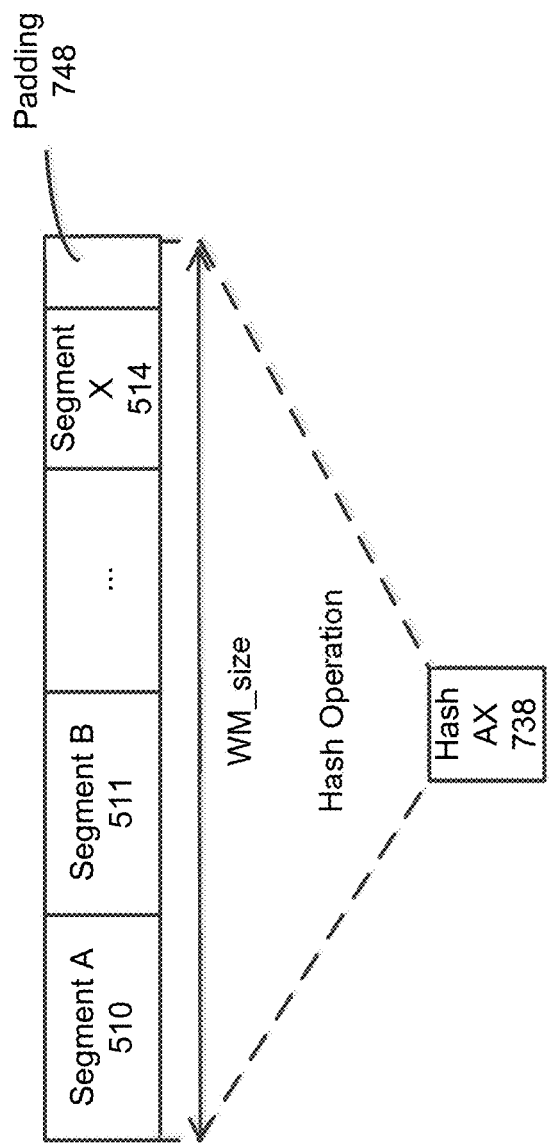
FIG. 7 illustrates grouping of multiple memory partitions of model weights of the neural network executable loadable file when the size of each of the multiple memory partitions of the model weights is less than a pre-configured weight-memory size according to one embodiment.

FIG. 7 illustrates grouping of multiple memory partitions of model weights of the NN ELF when the size of each of the multiple memory partitions of the model weights is less than a pre-configured weight-memory size according to one embodiment. When each of memory partitions of the model weights segment A (510), segment B (511), . . . segment X (514) is less than the wm_size, a grouping operation may group the memory partitions into a combined segment that is less than or equal to the wm_size. Padding 748 may be added to bring the size of the combined segment to wm_size. A hashing operation may hash the combined segment to generate hash AX (738).

Referring back to FIG. 5, memory partitions segment A (510) through segment X (514) containing the model weights of the NN ELF may be segmented or grouped into segments of wm_size and hashed as described in FIGS. 6 and 7. The memory partition 516 for the metadata is assumed to be less than the wm_size. The metadata may be treated as its own segment and hashed separately from the hash segments of the model weights. In one embodiment, padding may be added to the metadata to bring the size of the metadata to wm_size before the hashing operation. If the memory partition 516 for the metadata is greater than the wm_size, the metadata may be segmented into one or more segments of wm_size and hashed as for the model weights.

A concatenation operation may concatenate the hash segments of all the model weights generated from memory partitions segment A (510) through segment X (514) and the hash segment of the metadata generated from memory partition 516 into hash segment 518. In one embodiment, hash segment 518 may be further hashed and the hash of hash segment 518 may be encrypted or signed with the private key of an offline-generated public, private key pair. The encrypted hash of hash segment 518 may be decrypted using the public key during runtime.

Figure 8:
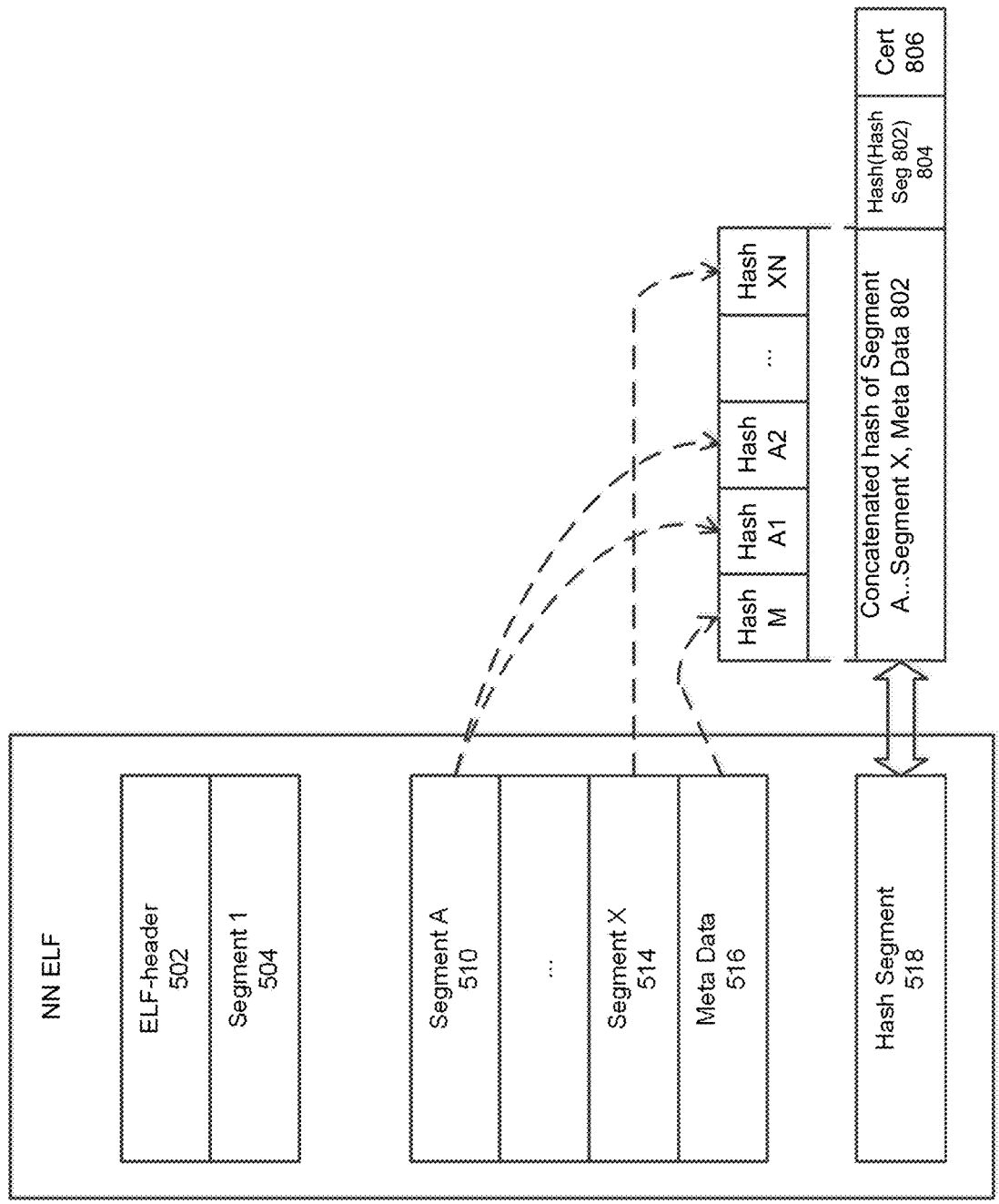
FIG. 8 shows online hashing of the metadata and online hashing of segmented model weights for comparison with the offline-generated concatenated hash segment of the NN ELF to verify the NN models during runtime according to one embodiment.

FIG. 8 shows online hashing of the metadata and online hashing of segmented model weights for comparison with the offline-generated hash segment 518 of the NN ELF to verify the NN models during runtime according to one embodiment. When NN core 330 is activated to run NN algorithms, the NN ELF of FIG. 5 is downloaded into NN SRAM 336 from DDR memories 316. The NN ELF contains the model weights in memory partitions segment A (510) through segment X (514), the metadata in memory partition 516, and hash segment 518. Hash segment 518 contains offline-generated concatenated hash of segmented model weights and hash of the metadata designated as 802, hash of the concatenated hash segment 802 designated as 804, and encrypted signature of the hash 804 of the concatenated hash segment 802 using the private key designated as 806

Cryptographic module 324 may decrypt the encrypted signature 806 using the public key of the public, private key pair to verify the concatenated hash segment 802. In one embodiment, the public key may be read from OPM 326. If the verification of the concatenated hash segment 802 is successful, cryptographic module 324 may verify the metadata by writing the metadata in memory partition 516 into the conf_wm 334 partition of NN SRAM 336. The conf_wm 334 partition has a memory size equivalent to the pre-configured memory size wm_size, which is the size of the metadata used for the offline-generated hash of the metadata. Cryptographic module 324 may generate the hash of the metadata in the conf_wm 334 partition. The online-generated hash of the metadata may be designated hash M. Cryptographic module 324 may compare the online-generated hash M with the offline-generated hash of the metadata retrieved from concatenated hash segment 802 to verify the metadata.

If the verification of the metadata is successful, cryptographic module 324 may verify the model weights in memory partition segment A (510) by writing successive segments of the model weights into the conf_wm 334 partition. The conf_wm 334 partition may thus contain the successive segments of the model weights used for the offline-generated hash of the segmented model weights from memory partition segment A (510). Cryptographic module 324 may generate the hash of the segmented model weights in the conf_wm 334 partition. For example, if memory partition segment A (510) contains two segments of the model weights, cryptographic module 324 may generate the hash of the two segmented model weights designated as hash A1 and hash A2. Cryptographic module 324 may compare the online-generated hash A1 and hash A2 with the offline-generated hash of the segmented model weights retrieved from concatenated hash segment 802 to verify the model weights in memory partition segment A (510).

Cryptographic module 324 may verify the model weights in the remaining memory partitions of the NN ELF by writing successively segments of the model weights into the conf_wm 334 partition, generating the hash of the segmented model weights, and comparing the online-generated hash of the segmented model weights with the offline-generated hash of the segmented model weights retrieved from concatenated hash segment 802. When the model weights and the metadata for an inference layer is verified, NN engine 332 may run the NN algorithms for the inference layer using the verified NN models. Cryptographic module 324 may verify the NN models for successive inference layers until NN engine 332 completes all the inference layers.

Figure 9:
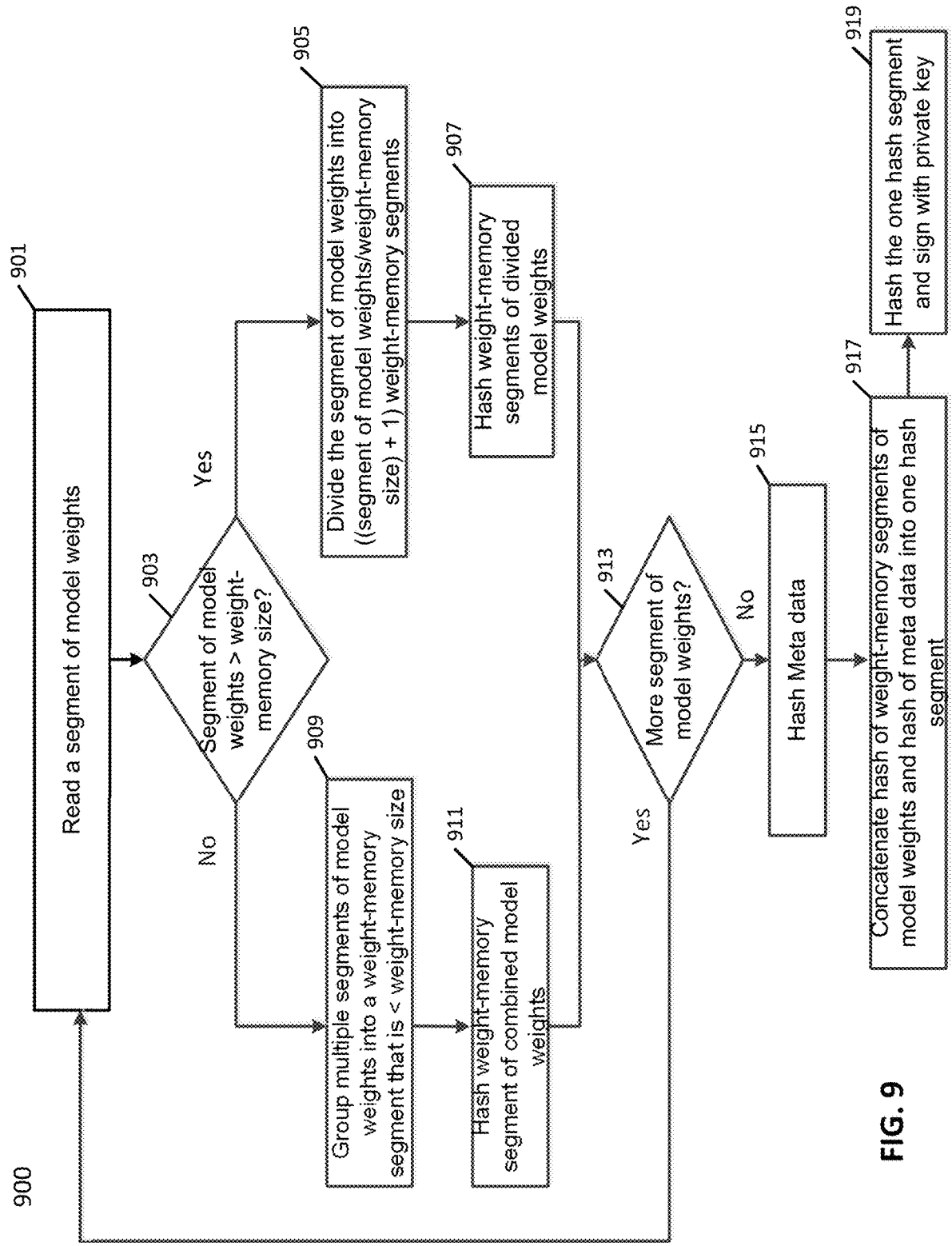
FIG. 9 is a flowchart illustrating a method of generating offline a hash segment concatenated from hash of segments of the model weights and hash of the metadata of the neural network executable loadable file according to one embodiment.

FIG. 9 is a flowchart illustrating a method 900 of generating offline a hash segment concatenated from hash of the segments of model weights and hash of the metadata of the NN ELF according to one embodiment. Method 900 may be performed by processing logic which may include software, hardware, or a combination thereof. For example, method 900 may be performed by cryptographic module 324, DSP or RISC 310, or external host 340.

At operation 901, the method 900 reads a segment of model weights. The segment of model weights may be a memory partition of the model weights of the NN ELF, such as segment A (510) or segment X (514) of FIG. 5.

At operation 903, the method 900 compares the size of the segment of model weights with the pre-configured weight memory size. The pre-configured weight memory size may be wm_size.

If the size of the segment of model weights is greater than the pre-configured weight memory size, at operation 905, the method 900 divides the segment of model weights into multiple sub-segments. Each sub-segments of model weights may have the pre-configured weight memory size.

At operation 907, the method 900 hashes each sub-segments of model weights having the pre-configured weight memory size to generate hash sub-segments of model weights.

If the size of the segment of model weights is less than the pre-configured weight memory size, at operation 909, the method 900 reads one or more additional segments of model weights to group as many segments of model weights as may be combined to fit within the pre-configured weight memory size.

At operation 911, the method 900 hashes the combined segment of model weights having the pre-configured weight memory size to generate a hash combined-segment of model weights.

At operation 913, the method 900 determines if there is any more segment of model weights to hash. The additional segment may be additional memory partition of the model weights of the NN ELF. If there is at least one more segment of model weights to hash, the method 900 repeats operations 901, 903, 905, 907, or 901, 903, 909, 911 to generate the hash sub-segments of model weights or the hash combined-segment of model weights, respectively.

If there is no more segment of model weights to hash, at operation 915, the method 900 hashes the metadata to generate hash metadata. The size of the metadata is assumed to be less than the pre-configured weight memory size. In one embodiment, if the size of the metadata is greater than the pre-configured weight memory size, the method 900 may segment the metadata into one or more segments of pre-configured weight memory size and may hash the segmented metadata as for the sub-segments of the model weights.

At operation 917, the method 900 concatenates the hash sub-segments of model weights, the hash combined-segment of model weights, and the hash metadata into a concatenated hash segment.

At operation 919, the method 900 further hashes the concatenated hash segment of model weights and hash metadata. The method 900 encrypts or signs the hash of the concatenated hash segments with the private key of a public, private key pair. The method stores the encrypted hash of the concatenated hash segments in the NN ELF.

Figure 10:
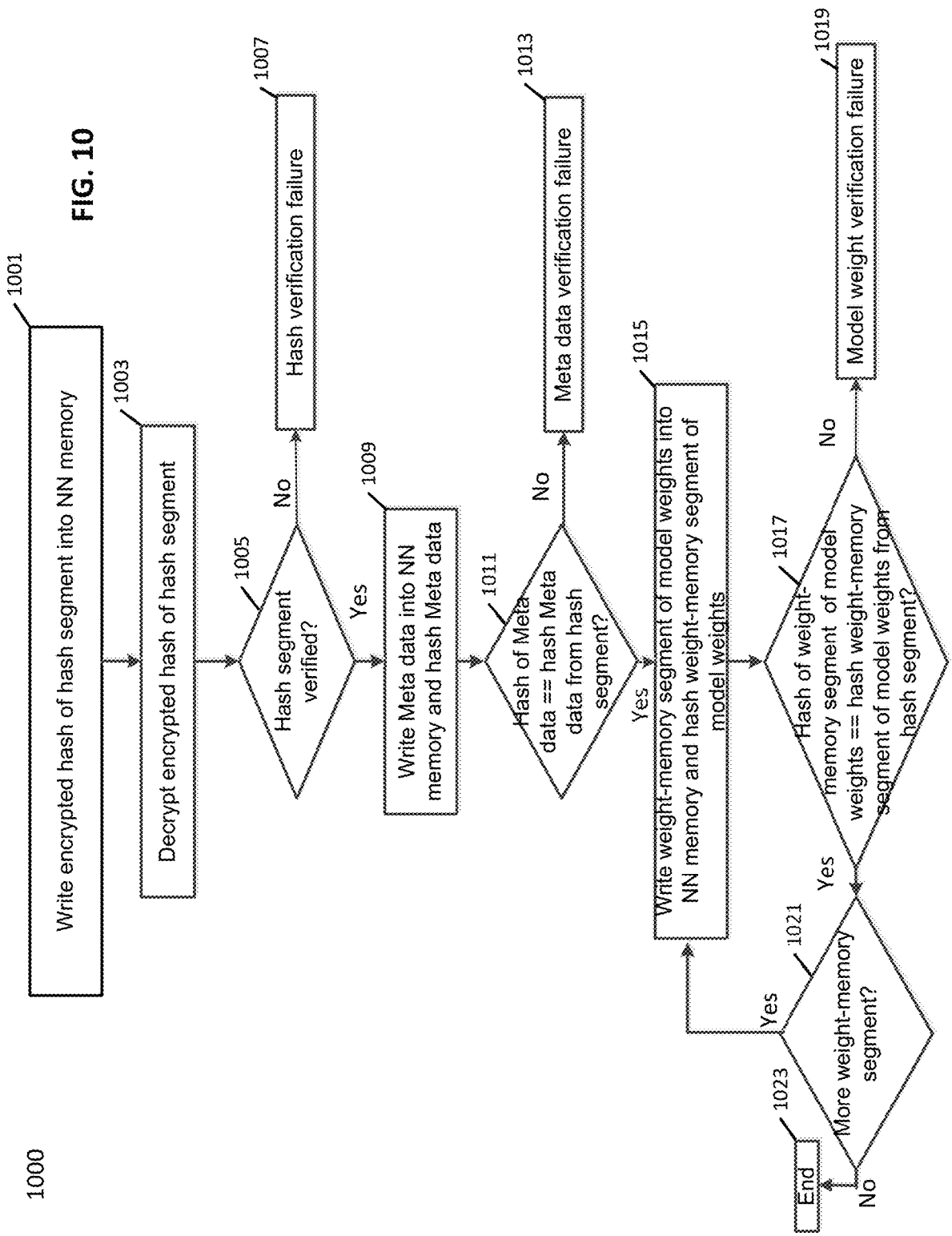
FIG. 10 is a flowchart illustrating a method of decrypting and verifying online a hash segment to perform an integrity check of segments of the model weights and of the metadata of the neural network executable loadable file according to one embodiment.

FIG. 10 is a flowchart illustrating a method 1000 of decrypting and verifying online a hash segment to perform an integrity check of segments of the model weights and of the metadata of the NN ELF according to one embodiment. Method 1000 may be performed by processing logic which may include software, hardware, or a combination thereof. For example, method 1000 may be performed by cryptographic module 324.

At operation 1001, the method 1000 writes the NN ELF containing one or more segments of model weights, the metadata, and the encrypted hash of the concatenated hash segments into the NN memory such as NN SRAM 336 of NN core 330. The concatenated hash segment contains the offline-generated concatenation of the hash sub-segments of model weights, the hash combined-segment of model weights, and the hash metadata.

At operation 1003, the method 1000 decrypts the encrypted hash of the concatenated hash segments using the public key of the public, private key pair to verify the concatenated hash segment. In one embodiment, the public key may be read from OPM 326.

At operation 1005, the method 1000 determines if the verification of the concatenated hash segment is successful. If the verification is not successful, at operation 1007, the method 1000 declares hash verification failure.

If the verification of the concatenated hash segment is successful, at operation 1009, the method 1000 writes the metadata from the NN ELF into a partition of the NN memory having a partitioned memory size equivalent to the pre-configured weight memory size. In one embodiment, the partition of the NN memory may be the conf_wm 334 partition of NN SRAM 336. The conf_wm 334 partition may have a memory size of wm_size. The method 1000 generates the hash of the metadata in the partition of the NN memory to yield the online-generated hash metadata.

At operation 1011, the method 1000 determines if the online-generated hash metadata is equal to the offline-generated hash metadata retrieved from the concatenated hash segment to verify the metadata. If the online-generated hash metadata is different from the offline-generated hash metadata, at operation 1013, the method 1000 declares metadata verification failure.

If the online-generated hash metadata is equal to the offline-generated hash metadata, at operation 1015, the method 1000 writes a sub-segment of a segment of the model weights from the NN ELF into the partition of the NN memory if the size of the segment of the model weights is greater than the pre-configured weight memory size. If the size of the segment of the model weights is less than the pre-configured weight memory size, the method 1000 writes one or more additional segments of model weights into the partition of the NN memory to group as many segments of model weights as may be combined to fit within the partition of the NN memory. The method 1000 generates the hash of the model weights in the partition of the NN memory to yield the online-generated hash of segmented model weights.

At operation 1017, the method 1000 determines if the online-generated hash of segmented model weights is equal to the offline-generated hash sub-segment of model weights or the offline-generated hash combined-segment of model weights to verify the segment of model weights. If they are different, at operation 1019, the method 1000 declares model weight verification failure 1019.

If the online-generated hash of segmented model weights is equal to the offline-generated hash sub-segment of model weights or the offline-generated hash combined-segment of model weights, at operation 1021, the method 1000 determines if there is any more segment of model weights to verify. If there is at least one more segment of model weights to verify, the method 1000 repeats operations 1015 and 1017 to verify the additional segment of model weights. If there is no more segment of model weights to verify, the method 1000 successfully verifies the NN model and terminates at operation 1023.

A data processing system may perform any of the processes or methods described above, such as, for example, the offline generation of the hash segment concatenated from hash of the segments of model weights and hash of the metadata of the NN ELF, or the online verification of the hash segment to perform an integrity check of segments of the model weights and of the metadata of the NN ELF. The data processing system can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

The data processing system may include one or more processors, one or more memories, and devices connected via a bus. Processors may represent one or more general-purpose processors such as a microprocessor, a central processing unit (CPU), or the like. More particularly, processors may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processors may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions. Processors may be configured to execute instructions stored in the memories for performing the operations and steps discussed herein.

Processing module/unit/logic, components and other features described herein can be implemented as discrete hardware components or integrated in the functionality of hardware components such as ASICS, FPGAs, DSPs or similar devices. In addition, processing module/unit/logic can be implemented as firmware or functional circuitry within hardware devices. Further, processing module/unit/logic can be implemented in any combination hardware devices and software components.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for protecting a model of a neural network (NN), the method comprising:
   reading successively a plurality of memory partitions of the model of the NN stored in a first memory;
   determining if a size of a memory partition of the plurality of memory partitions of the model is greater than a pre-configured memory size corresponding to a second memory;
   segmenting the memory partition of the model into a plurality of segments, each segment having a size of the pre-configured memory size, in response to determining that the size of the memory partition is greater than the pre-configured memory size;
   combining the memory partition with one or more additional memory partitions of the plurality of memory partitions of the model to fit a combined partition into the pre-configured memory size in response to determining that the size of the memory partition is less than the pre-configured memory size;
   hashing each of the plurality of segments and the combined partition to generate a plurality of hash segments;
   concatenating the plurality of hash segments into a concatenated hash segment of the model of the NN; and
   writing the concatenated hash segment of the model of the NN into the model of the NN in the first memory, wherein the concatenated hash segment is utilized to verify the model of the NN during runtime in the second memory.

2. The method of claim 1, wherein the memory partitions comprise model weights and metadata of the NN model.

3. The method of claim 2, wherein combining the memory partition with one or more additional memory partitions of the plurality of memory partitions of the model to fit a combined partition into the pre-configured memory size comprises:
   combining as many of the model weights as can be combined without a size of the combined partition of the model weights exceeding the pre-configured memory size.

4. The method of claim 2, wherein the metadata comprises one memory partition that is less than the pre-configured memory size, and wherein combining the memory partition with one or more additional memory partitions of the plurality of memory partitions of the model to fit a combined partition into the pre-configured memory size comprises treating the metadata separately from the model weights.

5. The method of claim 1, wherein the concatenated hash segment is written into the model of the NN in an NN executable loadable file (ELF) prior to loading and execution of the NN ELF by the NN.

6. The method of claim 1, wherein concatenating the plurality of hash segments into a concatenated hash segment comprises:
   hashing the concatenated hash segment to generate a hash of the concatenated hash segment; and
   encrypting the hash of the concatenated hash segment using a private key of a public, private key pair.

7. The method of claim 1, wherein segmenting the memory partition of the model into a plurality of segments comprises padding one segment of the plurality of segments to make a size of the one segment equal to the pre-configured memory size.

8. A data processing system, comprising:
   a processor;
   a memory coupled to the processor to store instructions, which when executed by the processor, cause the processor to perform operations, the operations comprising:
     reading successively a plurality of memory partitions of a model of a neural network (NN);

determining if a size of a memory partition of the plurality of memory partitions of the model is greater than a pre-configured memory size;

segmenting the memory partition of the model into a plurality of segments, each segment having a size of the pre-configured memory size, in response to determining that the size of the memory partition is greater than the pre-configured memory size;

combining the memory partition with one or more additional memory partitions of the plurality of memory partitions of the model to fit a combined partition into the pre-configured memory size in response to determining that the size of the memory partition is less than the pre-configured memory size;

hashing each of the plurality of segments and the combined partition to generate a plurality of hash segments;

concatenating the plurality of hash segments into a concatenated hash segment; and writing the concatenated hash segment of the model of the NN into the model of the NN, wherein the concatenated hash segment is utilized to verify the model of the NN during runtime.

9. The data processing system of claim 8, wherein the memory partitions comprise model weights and metadata of the NN model.

10. The data processing system of claim 9, wherein combining the memory partition with one or more additional memory partitions of the plurality of memory partitions of the model to fit a combined partition into the pre-configured memory size comprises:

combining as many of the model weights as can be combined without a size of the combined partition of the model weights exceeding the pre-configured memory size.

11. The data processing system of claim 9, wherein the metadata comprises one memory partition that is less than the pre-configured memory size, and wherein combining the memory partition with one or more additional memory partitions of the plurality of memory partitions of the model to fit a combined partition into the pre-configured memory size comprises treating the metadata separately from the model weights.

12. The method of claim 8, wherein the concatenated hash segment is written into the model of the NN in an NN executable loadable file (ELF) prior to loading and execution of the NN ELF by the NN.

13. The data processing system of claim 8, wherein concatenating the plurality of hash segments into a concatenated hash segment comprises:

hashing the concatenated hash segment to generate a hash of the concatenated hash segment; and encrypting the hash of the concatenated hash segment using a private key of a public, private key pair.

14. The data processing system of claim 8, wherein segmenting the memory partition of the model into a plurality of segments comprises padding one segment of the plurality of segments to make a size of the one segment equal to the pre-configured memory size.

15. A computer-implemented method for verifying a model of a neural network (NN), the method comprising:

verifying a concatenated hash segment of the model of the NN stored in the NN, the concatenated hash segment including a concatenation of a plurality of offline-generated hash segments hashed from a plurality of segments of the model, each of the plurality of segments of the model is of a pre-configured memory size;

hashing, successively, a segment of the plurality of segments of the model to generate an online-generated hash segment for the segment;

comparing the online-generated hash segment with the offline-generated hash segment corresponding to the segment;

verifying that the online-generated hash segment for each segment of the plurality of segments of the model equals to the offline-generated hash segment corresponding to the segment; and using the model of the NN in one or more inference layers of the NN.

16. The method of claim 15, wherein the model of the NN comprises model weights and metadata of the model.

17. The method of claim 16, wherein hashing, successively, a segment of the plurality of segments of the model to generate an online-generated hash segment for the segment comprises:

writing a segment of the model weights into a partition of a secure memory, wherein a size of the partition of the secure memory is the pre-configured memory size; and hashing the segment of the model weights in the partition of the secure memory to generate an online-generated hash segment for the segment of the model weights.

18. The method of claim 15, wherein the concatenated hash segment comprises an encryption of the concatenated hash segment using a private key of a public, private key pair, and wherein verifying a concatenated hash segment of the model of the NN comprises:

decrypting the encryption of the concatenated hash segment using the public key of the public, private key pair; and verifying the concatenated hash segment based on the decrypting of the encryption of the concatenated hash segment before hashing, successively, a segment of the plurality of segments of the model.

* * * * *